US012273063B2

(12) United States Patent
Calange et al.

(10) Patent No.: US 12,273,063 B2
(45) Date of Patent: Apr. 8, 2025

(54) DEVICE FOR BRAKING A ROTATING TOOL IN A COOKING APPARATUS

(71) Applicant: HAMEUR, Luxembourg (LU)

(72) Inventors: Yves Calange, Luxembourg (LU); Marie Michel, Luxembourg (LU)

(*) Notice: Subject to any disclaimer, the term of this patent is extended or adjusted under 35 U.S.C. 154(b) by 147 days.

(21) Appl. No.: 17/999,054

(22) PCT Filed: May 18, 2021

(86) PCT No.: PCT/EP2021/063159
§ 371 (c)(1),
(2) Date: Nov. 17, 2022

(87) PCT Pub. No.: WO2021/233920
PCT Pub. Date: Nov. 25, 2021

(65) Prior Publication Data
US 2023/0188060 A1    Jun. 15, 2023

(30) Foreign Application Priority Data

May 18, 2020  (FR) ...................... 2004926

(51) Int. Cl.
| H02P 3/12 | (2006.01) |
| A47J 36/32 | (2006.01) |
| A47J 43/046 | (2006.01) |
| A47J 43/08 | (2006.01) |

(52) U.S. Cl.
CPC ............. *H02P 3/12* (2013.01); *A47J 36/32* (2013.01); *A47J 43/046* (2013.01); *A47J 43/085* (2013.01)

(58) Field of Classification Search
CPC ........................................................ H02P 3/12
See application file for complete search history.

(56) References Cited

U.S. PATENT DOCUMENTS

| 3,673,481 | A |   | 6/1972 | Hardin |
| 3,715,643 | A | * | 2/1973 | Masaki ................. D05B 69/12 318/382 |
| 5,644,112 | A |   | 7/1997 | Geiger et al. |
| 8,707,862 | B1 | * | 4/2014 | Oliver ................... A47J 36/165 99/348 |
| 9,614,466 | B2 | * | 4/2017 | Usselman ................ H02P 3/22 |

FOREIGN PATENT DOCUMENTS

| EP | 1580877 A2 | 9/2005 |
| WO | 9502276 A1 | 1/1995 |

OTHER PUBLICATIONS

ISR; European Patent Office; NL; Aug. 26, 2021.

* cited by examiner

*Primary Examiner* — Bickey Dhakal
(74) *Attorney, Agent, or Firm* — Patshegen IP; Moshe Pinchas

(57) ABSTRACT

The device for braking an electric motor comprises a rotor provided with two brushes and a stator comprising at least two half-coils connected in series to the brushes while the motor is nominally activated.
Said device comprises a means for underpowering, the motor, a means for connecting in series a single half-coil to the rotor brushes and a means for controlling the braking by underpowering the motor until at least one value of a physical quantity reaches a predetermined value and the single half-coil is connected in series to the rotor brushes when the value of a physical quantity reaches the predetermined value.

10 Claims, 8 Drawing Sheets

DEVICE FOR BRAKING A ROTATING TOOL IN A COOKING APPARATUS

TECHNICAL FIELD OF THE INVENTION

The present invention relates to a device for braking a rotating tool in a cooking appliance. It applies, in particular, to the field of domestic or professional cooking appliances.

STATE OF THE ART

Cooking appliances provided with a rotating tool comprise a drive motor driving the tool. This motor comprises a stator and a rotor. The stator creates a fixed longitudinal magnetisation by means of permanent magnets or windings (inductor). The rotor is formed of an assembly of coils connected to a rotating commutator. The rotating commutator makes it possible to keep the rotor's transverse direction of magnetisation fixed while the rotor turns. Thanks to this device, the rotor and stator magnetisations are always optimally offset (quadrature). This offset causes a torque according to the law of maximum flow (a north pole attracts a south pole), thereby causing the rotation of the rotor.

In a cooking appliance, rapid braking of the tool is necessary for safety reasons. In particular, if the user opens the cover of a bowl containing the tool, for example a rotating cutting blade, this blade must be stopped before the user can drop a utensil into the bowl.

It is considered, and the applicable standards confirm this, that the stopping must be completed in less than two seconds, with the bowl empty. Consequently, the freewheeling of the motor, which is no longer electrically powered, is not sufficient to stop the tool within the required braking time. The known braking systems present premature wear, especially of the carbon brushes and commutator.

For braking the rotation of the motor, it is known to connect the two carbon brushes (or brushes) of the electric motor to a single coil so that the motor becomes a dynamo. However, this heavy braking causes sparks on the carbon brushes and similar ageing of the motor.

SUBJECT OF THE INVENTION

The present invention aims to remedy all or part of these drawbacks.

To this end, according to a first aspect, the present invention relates to a device for braking an electric motor comprising a rotor provided with two brushes and a stator comprising two half-coils connected in series to the brushes while the motor is nominally activated, which device comprises a means for underpowering the motor, a means for connecting in series a single half-coil to the rotor brushes and a means for controlling the braking by underpowering the motor until at least one value of a physical quantity reaches a predetermined value, and for connecting in series said single half-coil to the rotor brushes when the value of a physical quantity reaches the predetermined value.

Underpowering of the motor is defined as an electric power supply providing less power than required to maintain the rotational speed of the motor. In many electric motors, this power is controlled by the voltage applied to the motor. The underpowering consists of a power reduction ramp, power reduction by stages, or in a cutting of the electrical power supply of the motor, also known as "freewheeling".

The underpowering phase, or "passive" braking, makes it possible to reduce the rotational speed of the motor thanks to the friction of the motor, shaft and the tool mounted on the shaft. When this speed is reduced sufficiently, e.g. when it is below a predetermined speed or an underpowering duration has reached a predetermined value, the commutator of the rotor is directly connected, by means of brushes, to said single half-coil of the stator, which constitutes braking known as "active". During active braking, the rotor is therefore a direct current generator. This current generated by the rotor is injected into the half-coil that is connected in series, which causes rapid braking of the rotor without generating sparks. Note that the changeover to the active braking phase can also depend on signals received from embedded safety fault detectors.

In some embodiments, the means for underpowering the motor is configured to freewheel the motor.

Thanks to these provisions, underpowering is easy to achieve since it consists of cutting the supply to the electric motor. In addition, braking is faster than with a gradual reduction in the electrical power supplied to the motor.

In some embodiments, one physical quantity is the rotational speed of the electric motor and the predetermined value is below the nominal rotational speed of the motor.

These embodiments reduce the risk of sparks in the motor during active braking. These embodiments are especially suitable for variable speed motors and expensive equipment.

In some embodiments, the predetermined value for the speed is higher than half the nominal rotational speed of the electric motor.

In some embodiments, one physical quantity is the time elapsed since the electric motor was underpowered.

These embodiments make it possible to ensure that the total braking time is below a regulatory duration. This variant also has the advantage of not requiring a tachometer. It can, in particular, apply to low-cost single-speed cooking appliance, for example coffee mills.

In some embodiments, the predetermined value for the time elapsed since the electric motor was underpowered by freewheeling is between 0.2 seconds and 1.5 seconds.

In some embodiments, the means for connecting in series the single half-coil to the rotor brushes comprises:
  two synchronised simultaneous changeover contacts; and
  a resistor electrically placed between one terminal of the changeover contact, on the one hand, and a connection between one half-coil and one terminal of the changeover contact, on the other hand.

These embodiments have the advantage of being easy to implement, with low-cost components.

In some embodiments, the means for connecting in series the single half-coil to the rotor brushes is configured to directly connect a commutator of the rotor, by means of brushes, to said single half-coil of the stator, the rotor then being a generator of a direct current that is injected into said half-coil.

These embodiments have the advantage of being easy to implement, with low-cost components.

According to a second aspect, the present invention relates to a cooking appliance comprising an electric motor for setting in rotation a tool in a bowl, and a device for braking the tool that is the subject of the invention.

According to a third aspect, the present invention relates to a method for braking an electric motor comprising a rotor provided with two brushes and a stator comprising two half-coils connected in series to the brushes while the motor is nominally activated, which method comprises:
  a step of underpowering the motor until at least one value of a physical quantity reaches a predetermined value; and a step of connecting in series a single half-coil (49) to the rotor brushes when a value of a physical quantity reaches the predetermined value.

When the underpowering consists of freewheeling, the braking method comprises:
   a step of freewheeling the motor until at least one value of a physical quantity reaches a predetermined value; and
   a step of connecting in series a single half-coil to the rotor brushes when a value of a physical quantity is greater than the predetermined value.

In some embodiments, the step of connecting in series said single half-coil to the rotor brushes directly connects a commutator of the rotor, by means of brushes, on said single half-coil of the stator, the rotor then being a generator of a direct current that is injected into said half-coil.

As the particular features, advantages and aims of this appliance and this method are similar to those of the device that is the subject of the invention, they are not repeated here.

BRIEF DESCRIPTION OF THE FIGURES

Other advantages, aims and particular features of the invention will become apparent from the non-limiting description that follows of at least one particular embodiment of the tool and appliance that are the subjects of the present invention, with reference to drawings included in an appendix, wherein.

DESCRIPTION OF THE EMBODIMENTS

The present description is given in a non-limiting way, in which each characteristic of an embodiment can be combined with any other characteristic of any other embodiment in an advantageous way. In addition, each parameter of an example of realization can be utilized independently from the other parameters of said example of realization.

Note that the figures are not to scale.

Figure 1:
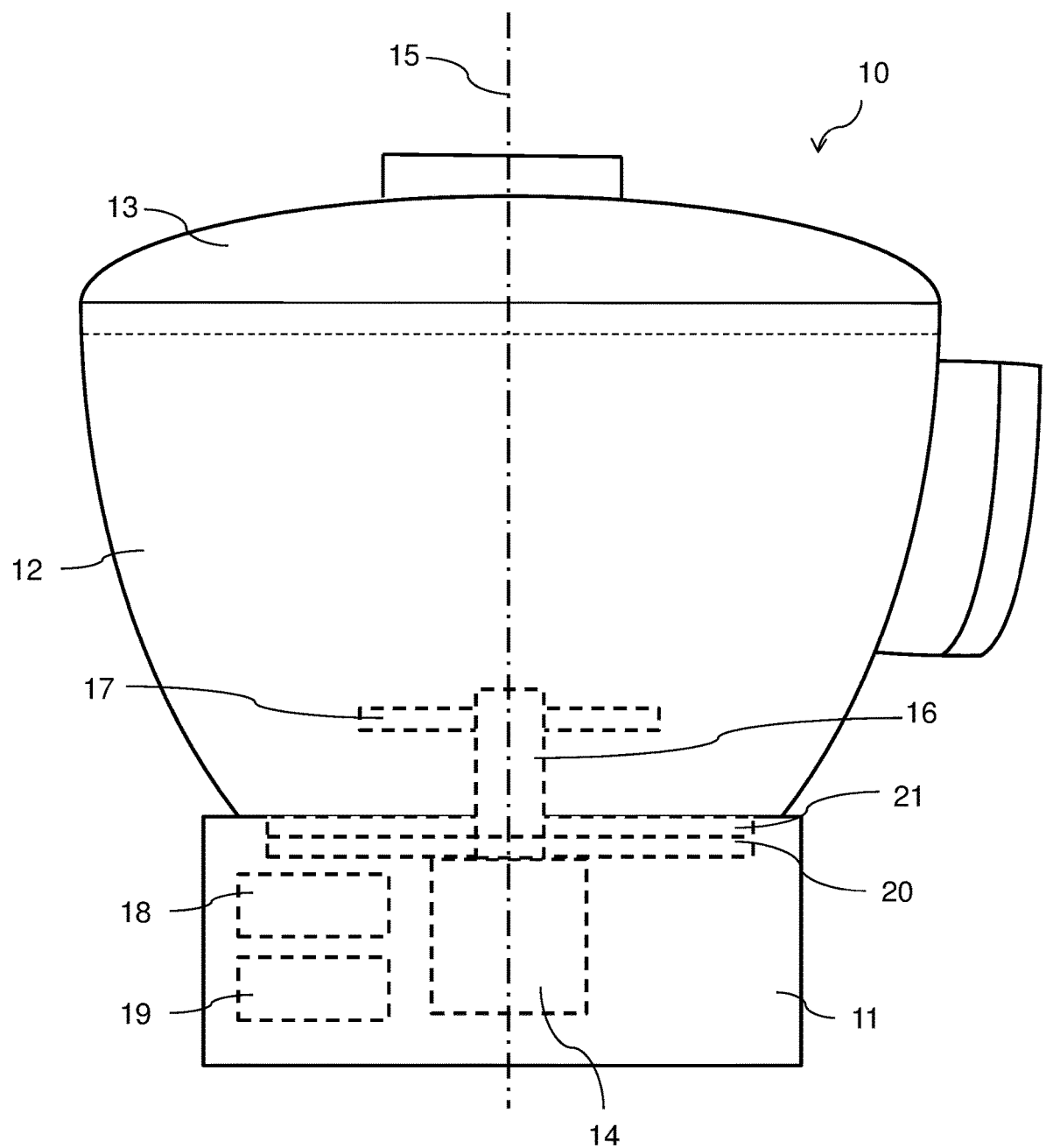
FIG. 1 represents, schematically, a cooking appliance that is the subject of the invention.

FIG. 1 shows a cooking appliance 10 which comprises a bowl 12 mounted on a motor unit 11, and a cover 13 placed on and closing the bowl 12. The motor unit 11 comprises a motor 14 for actuating a tool 17 mounted on a shaft 16 and positioned in the bottom of the bowl 12. The axis of rotation 15 of the motor 14, shaft 16 and tool 17 is generally aligned with an axis of the bowl 12 and cover 13.

The motor unit 11 is possibly equipped with a heating resistor 20 for heating the food preparation, generally liquid or doughy, in the bowl 12, through the bottom of the bowl 21. As the cooking appliance 10 is shown in its position of use, the term "top" or "upper" refers to being located at the top of FIG. 1, and "bottom" or "lower" to being located at the bottom of this figure. The term "inside" or "inner" refers to being located closest to the axis 30, and "outside" or "outer" to being located farther away.

In the motor unit 11 there is a circuit 18 controlling the operation of the motor, firstly as a function of instructions given by a user through a user interface, e.g. a simple switch or a touchscreen, and secondly as a function of the states of safety sensors, e.g. detection of the presence of a bowl locked on the motor unit and a cover locked on the bowl. In the motor unit 11 there is also an activation circuit 19 activating the freewheeling and braking of the motor.

The electric motor comprises a rotor provided with two brushes and a stator comprising at least two half-coils connected in series to the brushes while the motor is nominally activated.

The device for braking the electric motor comprises:
   a means for underpowering the motor electrically;
   a means for connecting in series a single half-coil to the rotor brushes; and
   a means for controlling the braking by the electrical underpowering of the motor until at least one value of a physical quantity reaches a predetermined value and a single half-coil is connected in series to the rotor brushes when the value of a physical quantity reaches the predetermined value.

In the rest of the description, embodiments are described with reference to the figures in which the electrical underpowering consists of freewheeling, i.e. cutting the electrical power supply to the motor. However, the person skilled in the art knows how to produce power reduction ramps or staged reductions of the electrical power supply without the need to describe them below. Variants utilising these types of gradual reducers of the electrical power supply of the motor are indicated in the following description.

In the embodiments shown in the figures, the device for braking the electric motor comprises:
   a means for freewheeling the motor;
   a means for connecting in series a single half-coil to the rotor brushes; and
   a means for controlling the braking by freewheeling the motor until at least one value of a physical quantity reaches a predetermined value and connecting in series a single half-coil to the rotor brushes when the value of a physical quantity reaches the predetermined value.

In some embodiments, one physical quantity for initiating active braking, by this connection, is the rotational speed of the electric motor and the predetermined value is below the nominal rotational speed of the motor. For example, the predetermined value for the speed is higher than half the nominal rotational speed of the electric motor.

In some embodiments, possibly cumulative with the preceding ones, one physical quantity for initiating active braking, by this connection, is the time elapsed since the electric motor was freewheeled. For example, the predetermined value for the time elapsed since the electric motor was freewheeled is between 0.2 seconds and 1.5 seconds.

In some variants with gradual reduction of the electrical power supply of the motor, one physical quantity is the time elapsed since the electric motor was underpowered.

One embodiment 30 of the activation circuit 19 activating the freewheeling and braking of the motor, is shown in FIGS. 2 to 7, during different operating phases of the motor 14. In FIGS. 2 to 7, the arrows indicate the direction of the current through the various electrical elements of the motor 14 and of the activation circuit 19. The full straight lines represent electrical connections. Where the contacts of these lines include a semicircle, this means that there is no electrical connection. Where the contacts of these lines do not include a semicircle, this shows that there is an electrical connection.

FIGS. 2 to 7 show the electrical components internal to the motor 14, above a motor terminal block with seven terminals, 32 to 38, and the electrical components external to the motor 14, below this terminal block.

The motor shown in these figures is, for example, a universal motor with two directions of rotation having a variable rotational speed of 0 to 12,600 revolutions per minute. A universal motor (or "series motor") operates nominally when the rotor (also called the "armature") is connected in series to the two half-coils of the stator (also called the "inductor"). This motor is called universal because it operates equally well with AC and DC power.

The present invention is not limited to motors having two half-coils; on the contrary, it extends to all motors having at least two half-coils, for example four.

To facilitate understanding, FIGS. 2 to 7 comprise arrows representing the direction of the current, according to the state of the relays.

On the motor side, one can see two half-coils, 48 and 49, of the stator mounted in series during the activation phases of the motor, two brushes, 50 and 51, of the rotor 54.

In some embodiments, where one physical quantity for initiating active braking is the rotational speed of the motor, a tachometer, e.g. a tachogenerator, 52 is connected to the rotor 54 by a mechanical connection 53 and supplies a signal representative (typically proportional) of the rotational speed of the rotor at the terminals 37 and 38 of the terminal block.

On the circuit 30 side, there are two relays comprised of double changeover contacts, 41, 42 and 46, on the one hand, and 44, 45 and 47 on the other hand. This means that the contacts 41 and 42 switch simultaneously, and the contacts 44 and 45 switch simultaneously. Relay 43 is a single changeover contact. Relay 43 controls the electrical power supply. Relays 44 and 45 control the direction of rotation of the rotor. Relays 41, 42 control the second phase of braking, as explained with reference to FIGS. 4 and 7.

A power supply with variable voltage 31 powers the circuit 30 and its components by means of relay 43. A resistor 39 is electrically placed between one terminal of the changeover contact 42, on the one hand, and a connection between the half-coil 49 and one terminal of the changeover contact 41, on the other hand. A microcontroller (not shown) manages the safety measures of the appliance 10 and the user interface, on the one hand, and controls the variable voltage supplied by the power supply 31, the regulation of the rotational speed of the rotor 54 and the switching of the relays, on the other hand.

Figure 2:
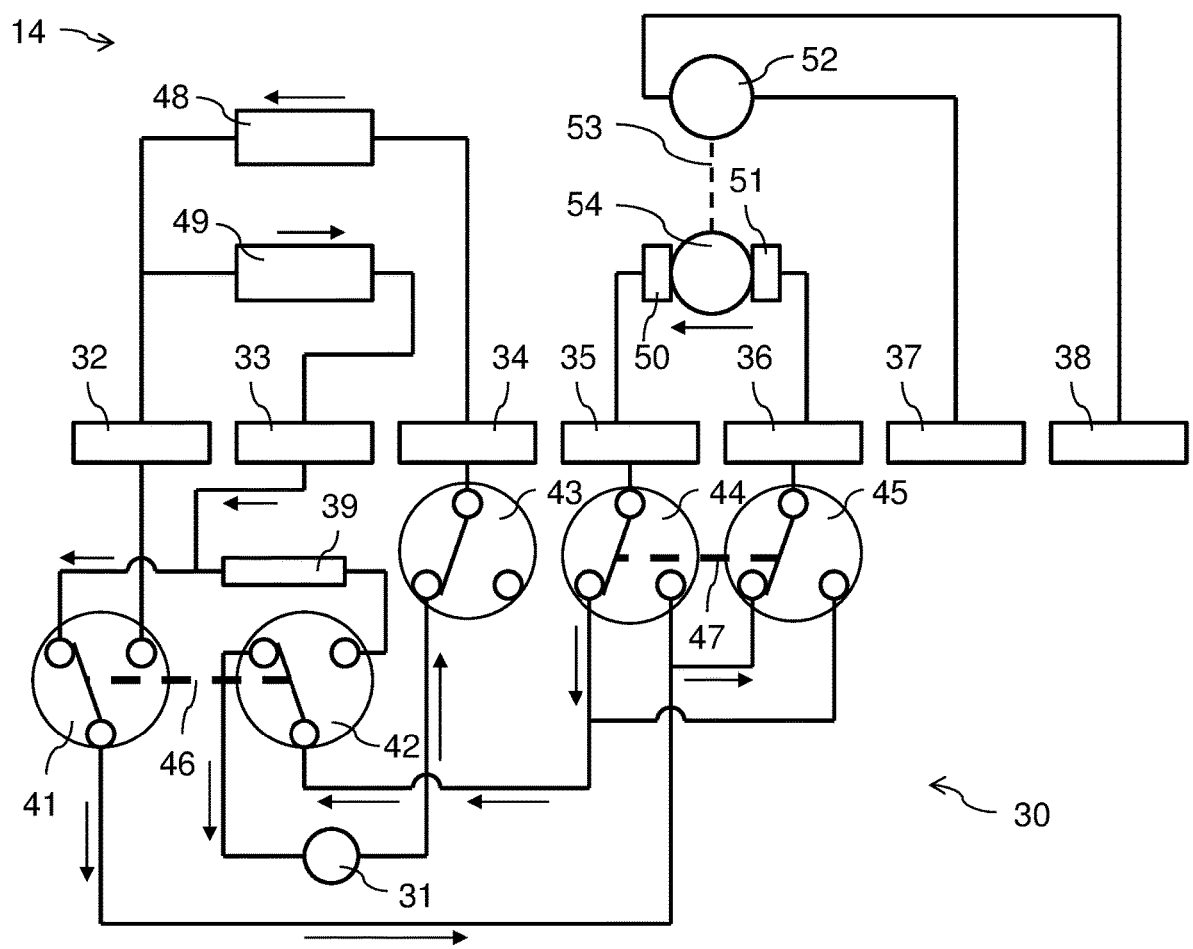
FIG. 2 represents the electrical control connections of an electric motor rotating in a clockwise direction, during its activation, freewheeling and braking.

To make the rotor 54 rotate in the clockwise direction, as shown in FIG. 2, the microcontroller controls the configuration of the relay 43 such that the half-coil 48 is powered, the configuration of relay 41 and 42 such that the half-coil 49 is in series with the half-coil 48, so that it is also powered, and the relay 44 and 45 such that the rotor 54 rotates in the clockwise direction. The two half-coils 48 and 49 and the brushes 50 and 51 being powered in series, the rotation of the rotor 54 is first of all accelerated and then stabilised at a speed that depends on the mechanical resistance exerted by the food preparation being processed. When the rotational speed is known to the microcontroller by means of the tachometer 52, this microcontroller can stabilise the speed at a predetermined value, by modifying the voltage at the terminals of the electrical power supply 31.

Figure 3:
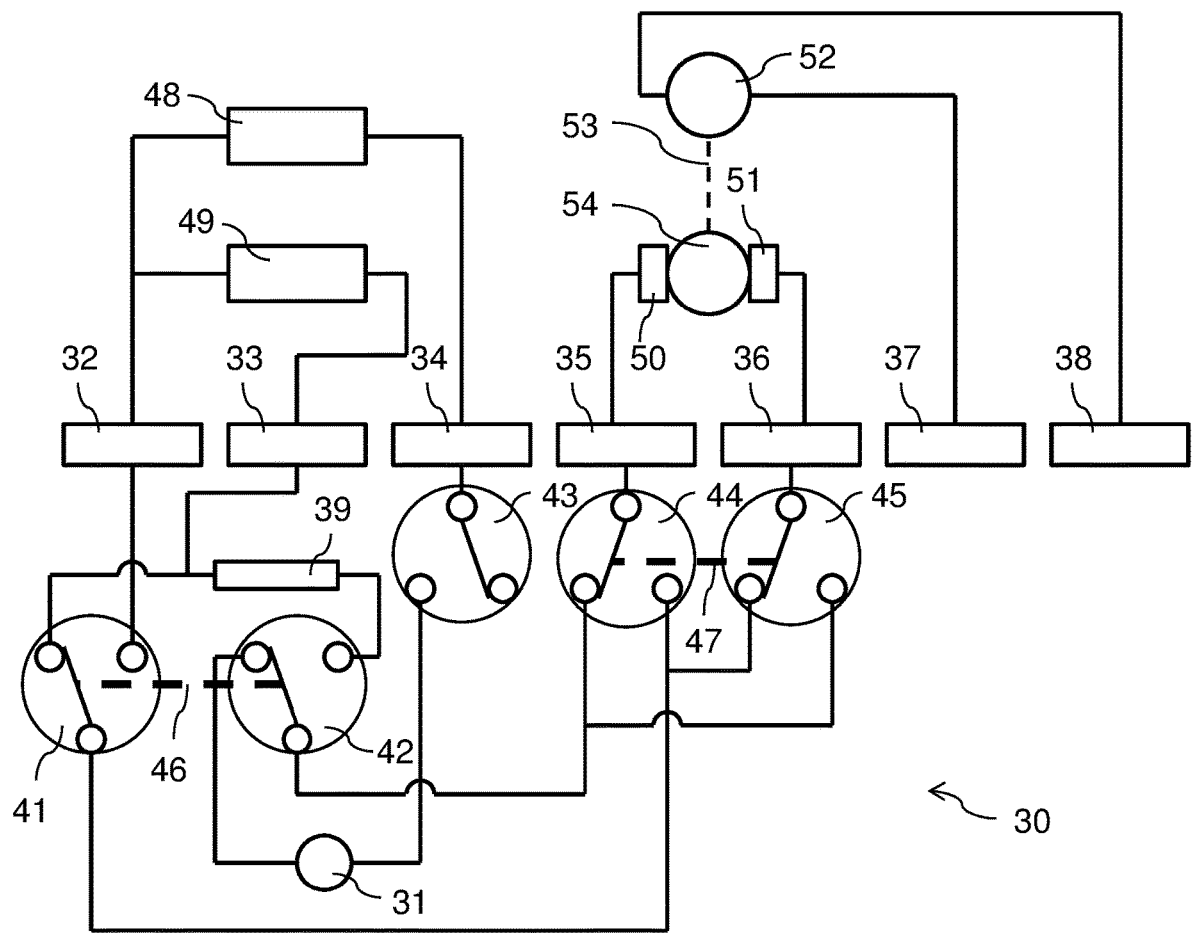
FIG. 3 represents the electrical control connections of an electric motor rotating in a clockwise direction, during its freewheeling.
Figure 4:
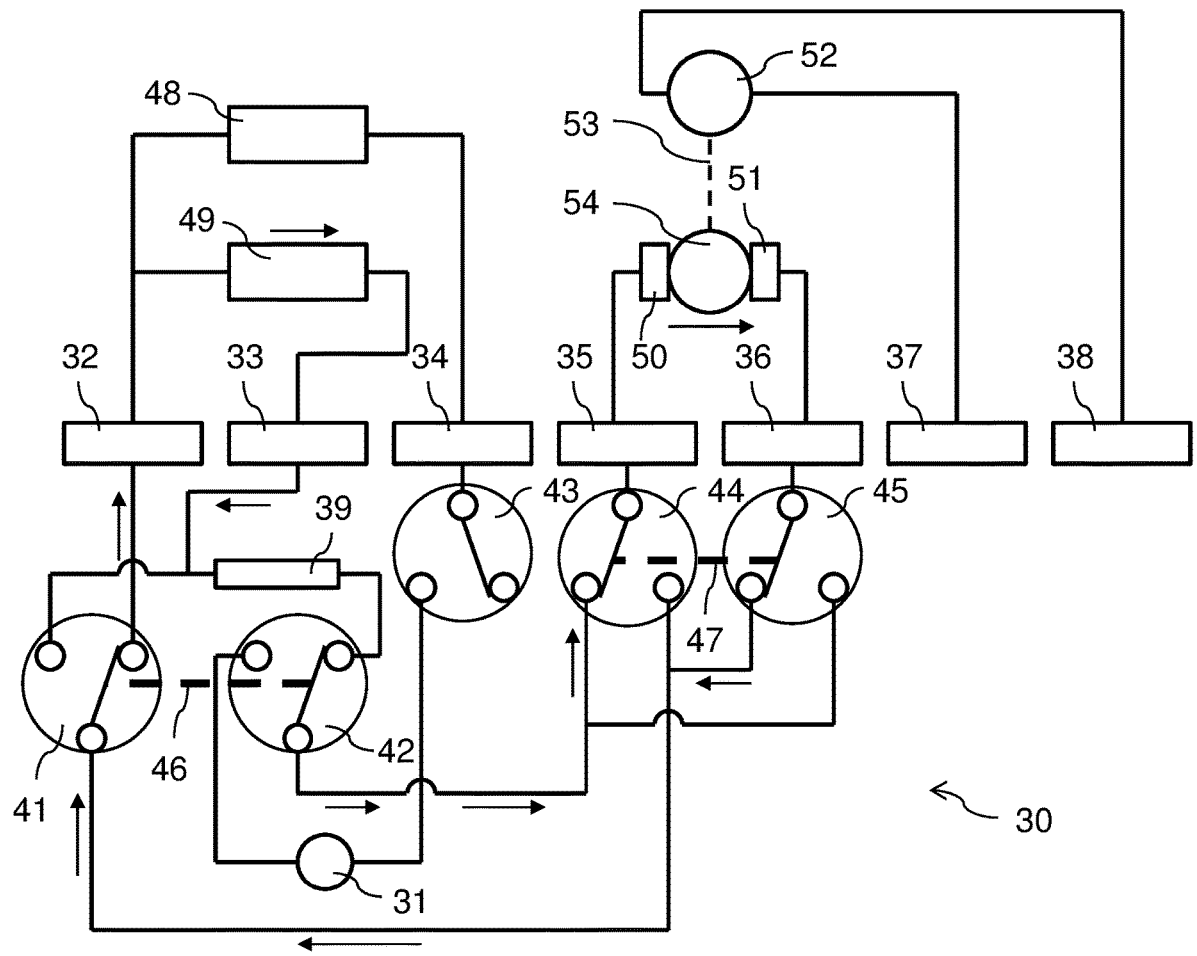
FIG. 4 represents the electrical control connections of an electric motor rotating in a clockwise direction, during its braking.

For braking the rotation of the rotor 54, if the rotational speed of the rotor is greater than a predetermined value, e.g. 10,000 revolutions per minute, first the microcontroller switches the configuration of relay 43 into the open position, as shown in FIG. 3. Once the rotational speed of the rotor 54 is less than or equal to the predetermined value, the microcontroller switches the configuration of relay 41 and 42, as shown in FIG. 4. The half-coil 49 is therefore electrically in series with the brushes 50 and 51 of the rotor 54. In this configuration, the commutator of the rotor 54 is connected directly, by means of the brushes 50 and 51, to the half-coil 49 of the stator. The rotor is therefore a direct current generator. This current generated by the rotor is injected into the half-coil 49, which causes the rapid braking of the rotor 54.

The electrical resistance 39 is the braking resistance, which limits the current sent by the rotor to the winding of the stator. Depending on its value, the electrical resistance 39 dissipates more or less energy, and therefore shortens the braking phase more or less. For example, the value of the resistance 39 is of the order of several tens of Ohms, e.g. between 10 and 50 ohms.

Figure 5:
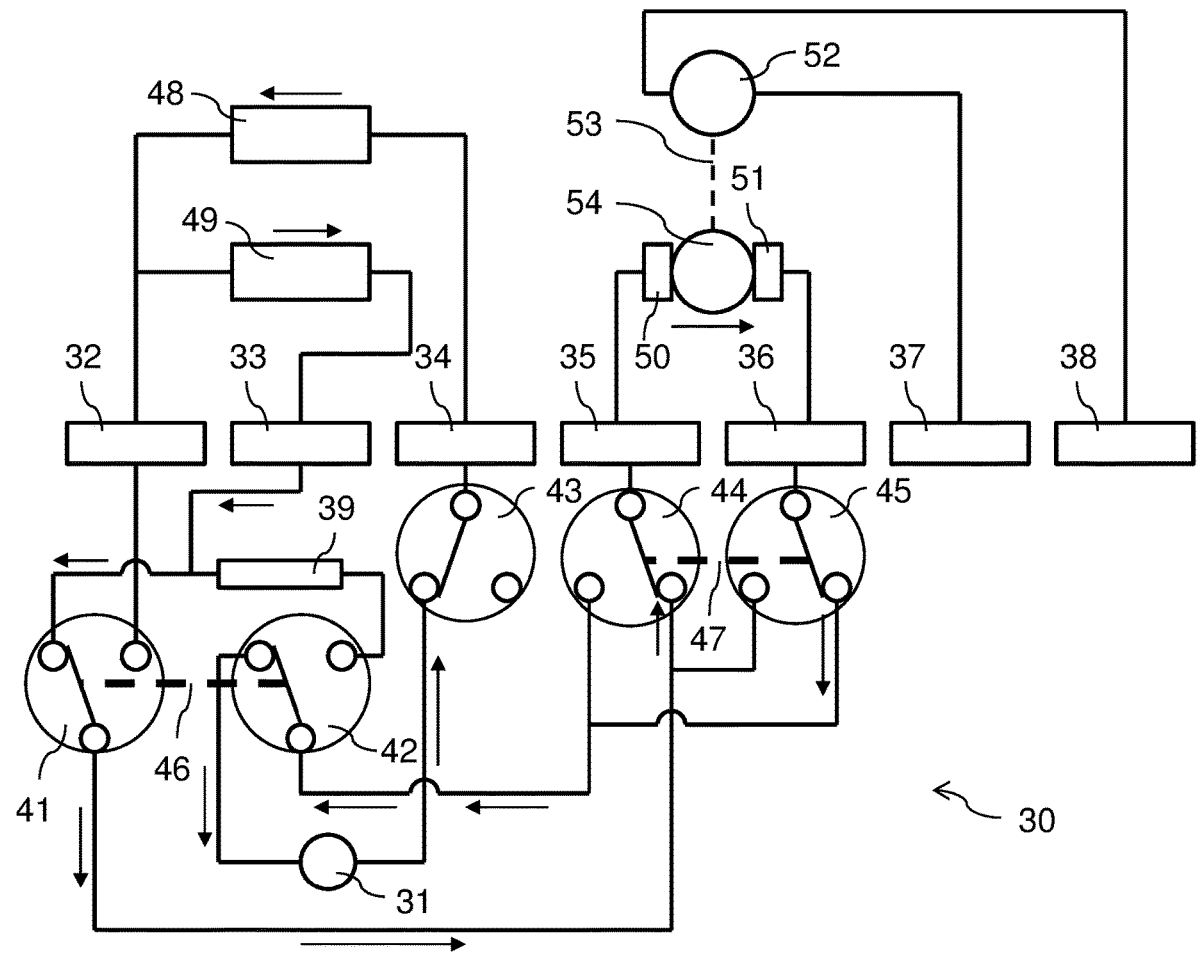
FIG. 5 represents the electrical control connections of an electric motor rotating in a counterclockwise direction, during its activation, freewheeling and braking.
Figure 6:
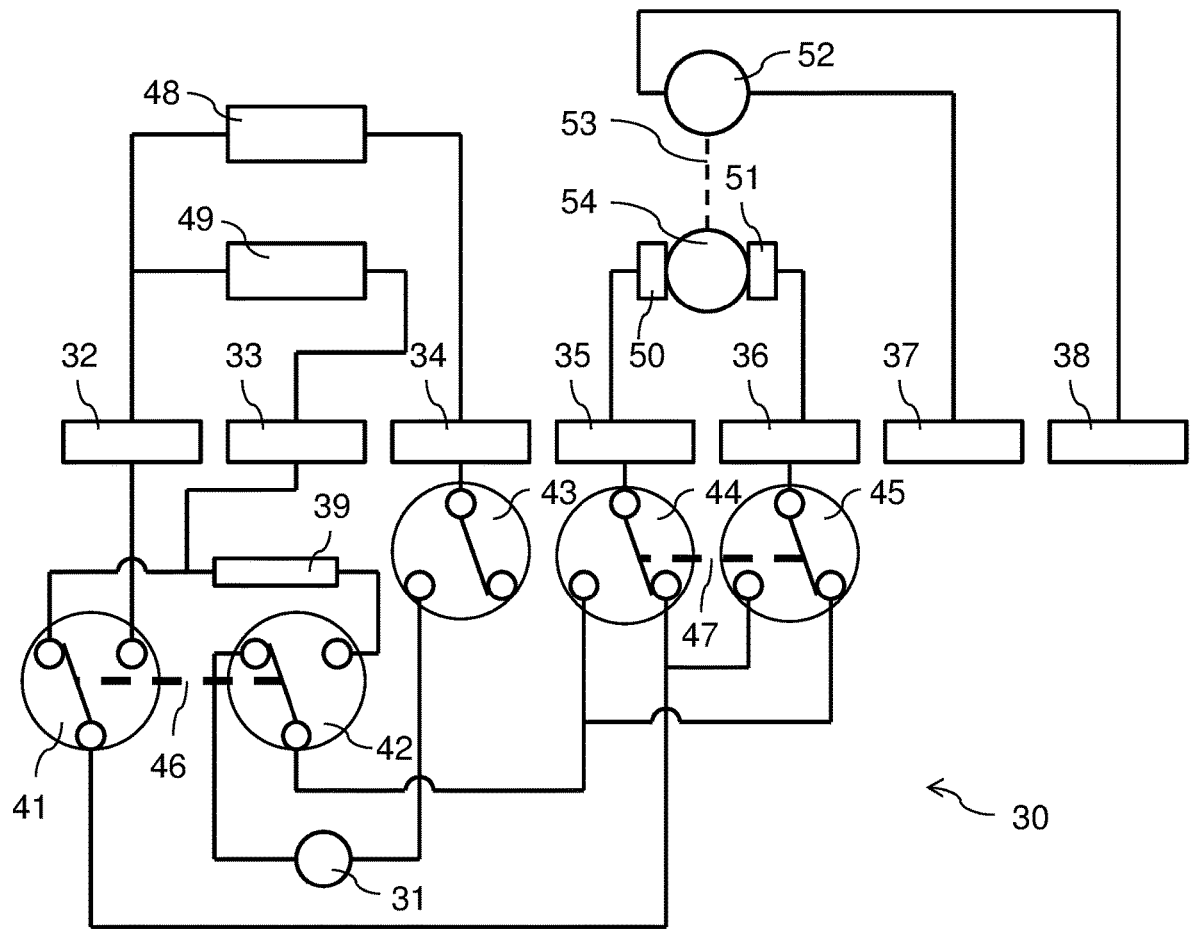
FIG. 6 represents the electrical control connections of an electric motor rotating in a counterclockwise direction, during its freewheeling.
Figure 7:
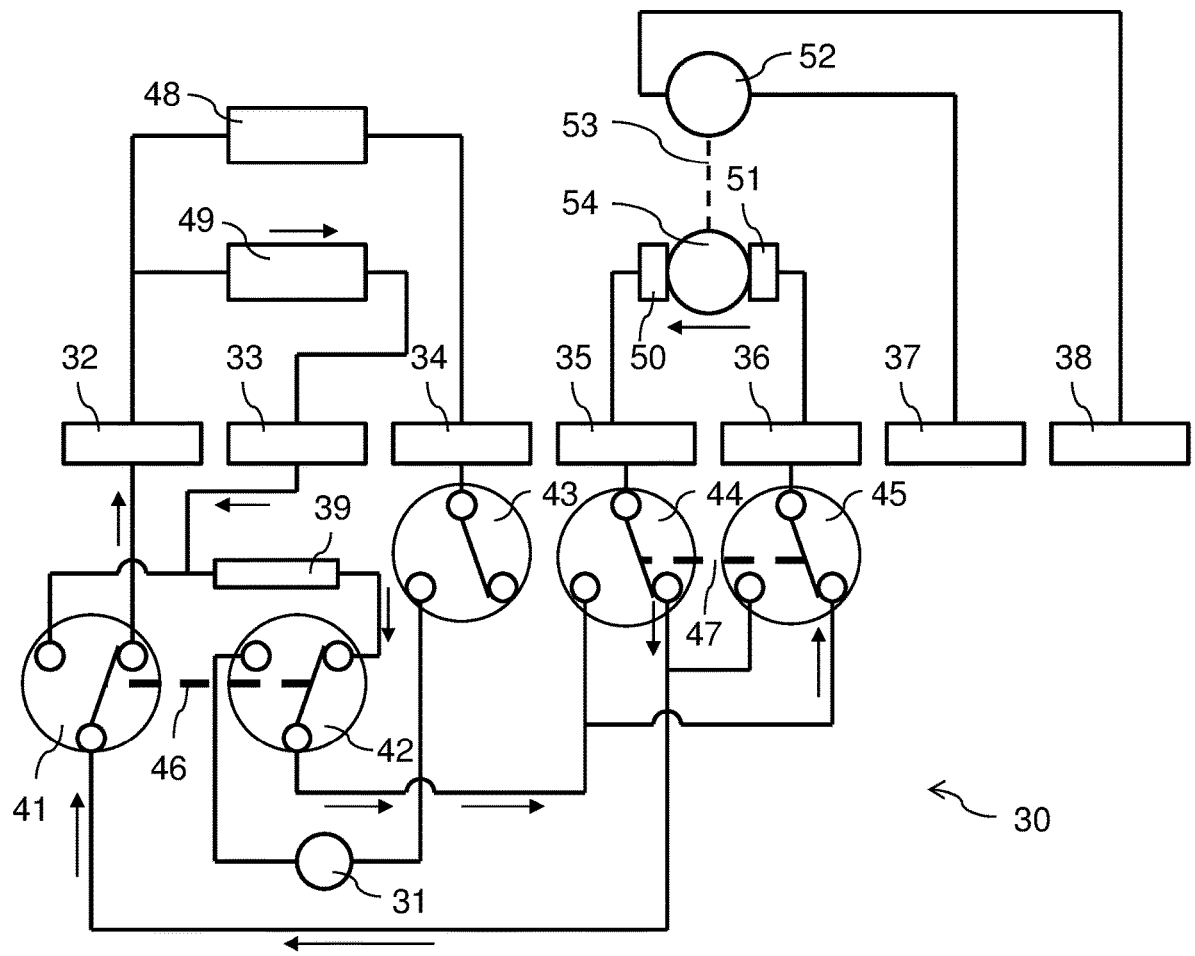
FIG. 7 represents the electrical control connections of an electric motor rotating in a counterclockwise direction, during its braking.

FIGS. 5 to 7, which concern the counterclockwise rotation of the rotor 54, are respectively identical to FIGS. 2 to 4, except that the relay 44 and 45 is in its opposite configuration. Therefore they are not described here.

Figure 8:
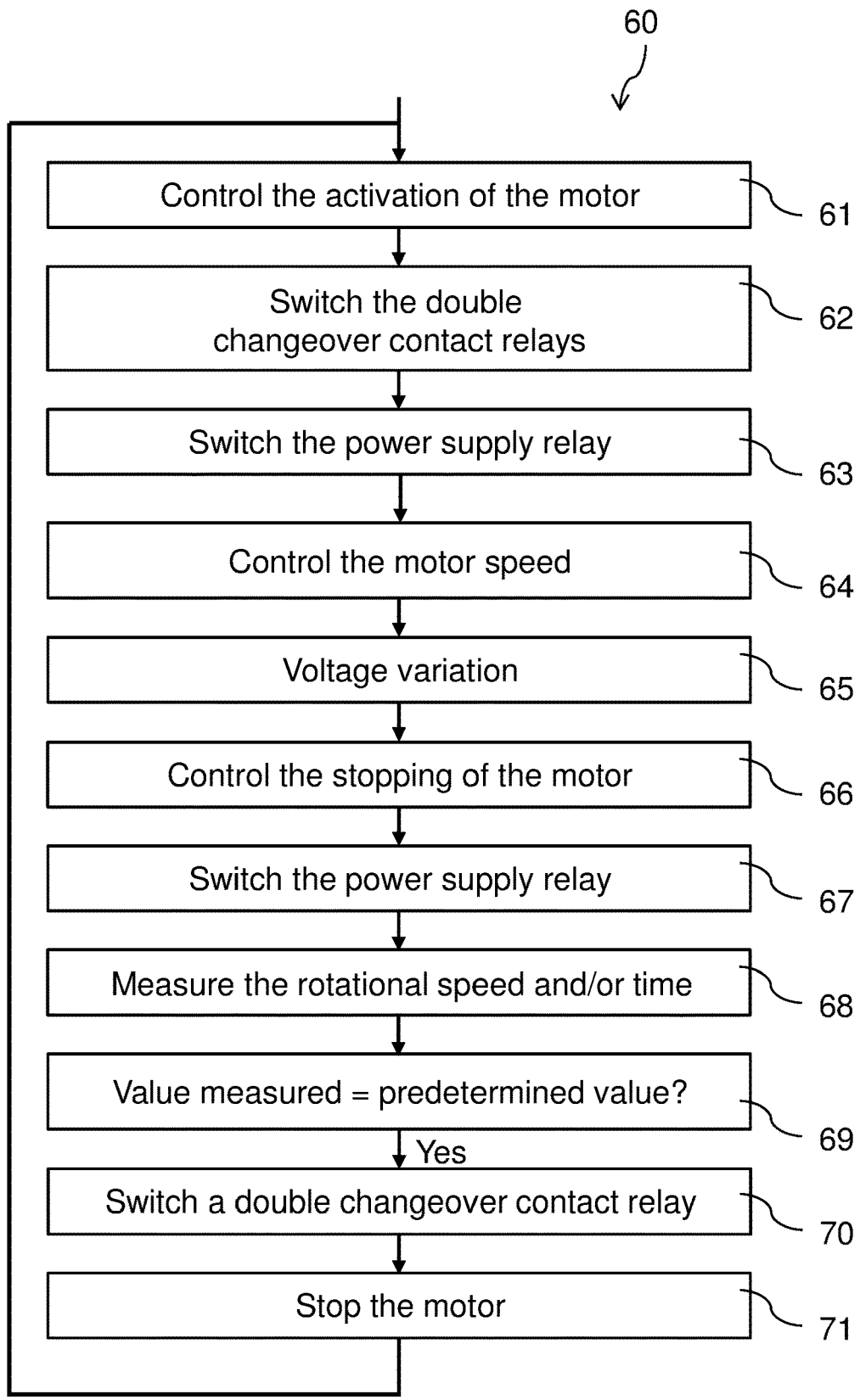
FIG. 8 represents steps in a particular embodiment of the method that is the subject of the present invention.

FIG. 8 shows steps of an embodiment 60 of the method that is the subject of the invention. During a step 61, the microcontroller begins the activation of the motor, for example under the action of the user interface, and verifies that the safety measures of the appliance allow the motor to be started. During a step 62, the microcontroller switches the relay 44 and 45 according to the desired direction of rotation, and the relay 41 and 42 to the position shown in FIGS. 1 and 4. During a step 63, the microcontroller closes the relay 43, which causes the rotor to be set in rotation, the two half-coils being powered in series with the brushes of the rotor. During a step 64, the microcontroller controls and servos the rotational speed of the motor by varying the voltage at the terminals of the electrical power supply to stabilise this speed at the desired speed. During a step 65, the microcontroller can vary the stabilised speed, for example during the cutting and gradual mincing of foodstuffs.

During a step 66, for example caused by the triggering of a safety measure, the end of an operational programme of the appliance or an instruction given by a user through the user interface of the appliance, the microcontroller starts the braking of the motor.

During a step 67, the microcontroller controls the switching of the relay 43 so that the motor is freewheeling and brakes under the effect of friction, in particular due to the resistance to movement of the tool in the bowl.

During a step 68, the microcontroller measures at least one physical quantity, the rotational speed of the motor and/or the time elapsed since the motor was freewheeled. During a step 69, the microcontroller compares the physical quantity measured, rotational speed of the motor and/or time elapsed since the motor was freewheeled, against a customised predetermined limit value.

In the case where the physical quantity measured is the speed, the microcontroller determines during step 69 whether the rotational speed of the motor is less than or equal to a predetermined value, for example 10,000 revolutions per minute. If this is not the case, step 69 is continued. Otherwise, during a step 70 the microcontroller controls the switching of the changeover contacts 41 and 42.

In the case where the physical quantity measured is the time elapsed since the motor was freewheeled, the microcontroller determines during step 69 whether this time is greater than or equal to a predetermined length of time, between 0.2 seconds and 1.5 seconds. If this is not the case, step 69 is continued. Otherwise, during a step 70 the microcontroller controls the switching of the changeover contacts 41 and 42.

In some variants with gradual reduction of the electrical power supply of the motor, during step 67, the microcontroller does not control the switching of the relay 43 but applies a decreasing power, continuously or in stages, to the electric motor. And, during step 70, the microcontroller controls the switching of the relay 43 then the switching of the changeover contacts 41 and 42.

The motor stops at step 71 and returns to the waiting mode step preceding step 61.

Note that, thanks to the utilisation of the invention, the complete braking time of the motor, from its highest speed and when the bowl is empty, i.e. when the food preparation does not play a role in the braking of the motor, is always less than two seconds and produces few or no sparks at the location of the brushes.

In a variant, the microcontroller controls the switching of the relay 41 and 42 as shown in FIGS. 4 and 7, not as a function of the rotational speed of the motor but instead as a function of the time elapsed since the motor was freewheeled as shown in FIGS. 3 and 6. This variant makes it possible to ensure that the total braking time is below a regulatory duration. This variant also has the advantage of not requiring a tachometer. It can, in particular, apply to low-cost single-speed cooking appliance, for example coffee mills.

In a variant, the microcontroller controls the switching of the relay 41 and 42 as shown in FIGS. 4 and 7 as a function, on the one hand, of the speed measured and, on the other hand, of a duration of freewheeling.

Of course, the two relays comprised of double changeover contacts, 41, 42 and 46 on the one hand, and 44, 45 and 47 on the other hand, can each be replaced by two relays of synchronised single changeover contact type.

The invention claimed is:

1. A device for braking an electric motor comprising
   a rotor provided with a first brush and a second brush and a stator comprising at least one first half-coil and at least one second half coil,
   a circuit for underpowering the motor,
   a connector configured for shifting between a first position in which said first and second half-coils are connected in series with said first and second brushes during an activating phase of the motor and a second position in which said second half-coil is connected in series with said first and second brushes during a braking phase of the motor and
   a control circuit for controlling the braking by underpowering the motor until at least one value of a physical quantity reaches a predetermined value, and for shifting said connector to said second position when the value of the physical quantity reaches the predetermined value, such that the rotor generates a DC voltage braking the motor.

2. The braking device according to claim 1, wherein the circuit for underpowering the motor freewheels the motor.

3. The braking device according to claim 1, wherein one physical quantity is the rotational speed of the electric motor and the predetermined value is below the nominal rotational speed of the motor.

4. The braking device according to claim 3, wherein the predetermined value for the speed is higher than half the nominal rotational speed of the electric motor.

5. The braking device according to claim 1, wherein one physical quantity is the time elapsed since the electric motor was underpowered.

6. The braking device according to claim 5, wherein the predetermined value for the time elapsed since the electric motor was underpowered is between 0.2 seconds and 1.5 seconds.

7. The braking device according to claim 1, wherein the connector for connecting in series the first and second half-coils to the rotor brushes comprises:
   two synchronised simultaneous changeover contacts; and
   a resistor electrically placed between a first terminal of a first changeover contact, on the one hand, and a connection between one half-coil and a second terminal of a second changeover contact, on the other hand.

8. The braking device according to claim 1, wherein the connector for connecting in series the first and second half-coils to the rotor brushes is configured to directly connect a commutator of the rotor, by means of rotor brushes, to said second half-coil of the stator, the rotor then being a generator of a direct current that is injected into said second half-coil.

9. A cooking appliance comprising an electric motor for setting in rotation a tool in a bowl, and the braking device according to claim 1.

10. A method for braking an electric motor comprising a rotor provided with a first and a second brushes and a stator comprising a first and a second half-coils connected in series to the first and second brushes while the motor is nominally activated, which method comprises:
    underpowering the motor until at least one value of a physical quantity reaches a predetermined value; and
    connecting the second half-coil in series to the first and second brushes of the rotor when the value of the physical quantity reaches the predetermined value, such that the rotor generates a DC voltage braking the motor.

\* \* \* \* \*